(12) United States Patent
Guan et al.

(10) Patent No.: US 11,334,669 B2
(45) Date of Patent: May 17, 2022

(54) METHOD FOR FAST AND INTELLIGENT COMPARISON AND SECURITY DETECTION OF MOBILE MALWARE BIG DATA

(71) Applicant: Jinan University, Guangdong (CN)

(72) Inventors: Quanlong Guan, Guangdong (CN); Weiqi Luo, Guangdong (CN); Huanming Zhang, Guangdong (CN); Zhefu Li, Guangdong (CN); Lin Cui, Guangdong (CN); Yuanfen Wu, Guangdong (CN)

(*) Notice: Subject to any disclaimer, the term of this patent is extended or adjusted under 35 U.S.C. 154(b) by 0 days.

(21) Appl. No.: 16/979,167

(22) PCT Filed: Mar. 29, 2019

(86) PCT No.: PCT/CN2019/080315
§ 371 (c)(1),
(2) Date: Sep. 8, 2020

(87) PCT Pub. No.: WO2020/168614
PCT Pub. Date: Aug. 27, 2020

(65) Prior Publication Data
US 2020/0410095 A1    Dec. 31, 2020

(30) Foreign Application Priority Data

Feb. 18, 2019   (CN) .......................... 201910118777.0

(51) Int. Cl.
*G06F 11/00* (2006.01)
*G06F 12/14* (2006.01)
(Continued)

(52) U.S. Cl.
CPC ............ *G06F 21/564* (2013.01); *G06F 21/54* (2013.01); *G06F 21/568* (2013.01);
(Continued)

(58) Field of Classification Search
CPC ...... G06F 21/564; G06F 21/54; G06F 21/568; G06F 21/577; G06F 21/602; G06K 9/6215
See application file for complete search history.

(56) References Cited

U.S. PATENT DOCUMENTS

2009/0022374 A1* 1/2009 Boult ................... G06K 9/6215
382/119

OTHER PUBLICATIONS

Zhou et al., Detecting Repackaged Smartphone Applications in Third-Party Android Marketplaces, 2012. (Year: 2012).*
(Continued)

*Primary Examiner* — Trong H Nguyen
(74) *Attorney, Agent, or Firm* — Prakash Nama; Global IP Services, PLLC

(57) ABSTRACT

A method for detecting mobile malware, including step S1: compressing a mobile software subject to detection and a primary mobile software each containing N functions, wherein each of the functions is compressed into a hash value, a description entropy and a compressed string; S2: calculating a quantity of identical functions between the mobile software subject to detection and the primary mobile software; and then finding out a quantity of similar functions using Hdsim method or entropy_descpt_sim method; and then calculating a degree of similarity to obtain a value of similarity; S3: comparing the value of similarity with a predetermined threshold value; if the value of similarity is greater then or equal to the predetermined threshold value, the mobile software subject to detection is suspected to repackaging; if the value of similarity is smaller than the predetermined threshold value, the mobile software subject to detection is not suspected to repackaging.

5 Claims, 3 Drawing Sheets

(51) Int. Cl.
*G06F 12/16* (2006.01)
*G08B 23/00* (2006.01)
*G06F 21/56* (2013.01)
*G06F 21/54* (2013.01)
*G06F 21/57* (2013.01)
*G06F 21/60* (2013.01)
*G06K 9/62* (2022.01)

(52) U.S. Cl.
CPC .......... *G06F 21/577* (2013.01); *G06F 21/602* (2013.01); *G06K 9/6215* (2013.01)

(56) References Cited

OTHER PUBLICATIONS

Desnos, Android: Static Analysis Using Similarity Distance, 2012. (Year: 2012).*
Hanna et al., Juxtapp: A Scalable System for Detecting Code Reuse Among Android Applications, 2012. (Year: 2012).*
Guan et al., Semantics-based Repackaging Detection for Mobile Apps, 2016. (Year: 2016).*

* cited by examiner

METHOD FOR FAST AND INTELLIGENT COMPARISON AND SECURITY DETECTION OF MOBILE MALWARE BIG DATA

BACKGROUND OF THE INVENTION

The present invention relates to the technical field of mobile security, and more specifically relates to a method for fast and intelligent comparison and security detection of mobile malware big data.

Following the rapid development in the field of mobile applications, there are over 5 million mobile applications in the market, and over 30 billion downloads were recorded. Due to the dynamic and promising market for tremendous number of mobile applications, more and more popular mobile applications are replicated and repackaged. Attackers usually repackage a programmed application to make profit from advertisement insertion or to spread malware. This situation is seriously detrimental to the ecology of programmed applications.

A prior art method of code comparison using massive string distance algorithms to process mobile software big data can only result in very slow security detection. Massive mobile software codes define a big data, and so the volume of calculation to compare their similarities is very huge. Therefore, the method based on string distance algorithms is not very effective.

In view of the above, there is a need of security detection method for software big data so as to detect repackaged or replicated mobile malware more quickly, and thus protect the ecology of big data of mobile programmed applications.

BRIEF SUMMARY OF THE INVENTION

An object of the present invention is to solve a prior art technical problem of seriously inaccurate detection of some repackaged or replicated programs based on coding functions by extracting fingerprints of programmed applications using fuzzy hash algorithm or by carrying out code similarity analysis algorithm using feature hashing. Accordingly, the present invention provides a method for fast and intelligent comparison and security detection of mobile malware big data.

The object of the present invention is achieved by the following technical solutions:

A method for fast and intelligent comparison and security detection of mobile malware big data, comprising the following steps:

S1: compressing both a mobile software subject to detection and a primary mobile software, wherein each of the mobile software subject to detection and the primary mobile software contains functions in a quantity of N, and each of the functions in each of the mobile software subject to detection and the primary mobile software is compressed into a hash value, a description entropy and a compressed string; and then storing each of the compressed mobile software subject to detection and the compressed primary mobile software as a document of a corresponding format;

S2: calculating a quantity of identical functions between the document of a corresponding format stored for the compressed mobile software subject to detection and the document of a corresponding format stored for the primary mobile software; and then also finding out a quantity of similar functions using Hdsim method or entropy_descpt_sim method; and then calculating a degree of similarity to obtain a value of similarity;

S3: comparing the value of similarity with a predetermined comparison threshold value a; if the value of similarity is greater than or equal to the predetermined comparison threshold value a, it is determined that the mobile software subject to detection is suspected to repackaging; if the value of similarity is smaller than the predetermined comparison threshold value a, it is determined that the mobile software subject to detection is not suspected to repackaging.

Further, said step S1 comprises the following steps:

S11: selecting the primary mobile software and the mobile software subject to detection arbitrarily as inputs from a massive amount of mobile application software;

S12: decompressing the primary mobile software and the mobile software subject to detection into op-code;

S13: converting the op-code into DALVIK virtual machine format;

S14: using sha256 compression function to generate the hash value for each function in each of the primary mobile software and the mobile software subject to detection; and using a Snappy compression function to generate the compressed string for each function in each of the primary mobile software and the mobile software subject to detection; and also calculating the description entropy for each function in each of the primary mobile software and the mobile software subject to detection;

S15: recording the hash values, the description entropy and the compressed strings of the functions of the primary mobile software by a txt document, and also recording the hash values, the description entropy and the compressed strings of the functions of the mobile software subject to detection by another txt document, and then exporting the two txt documents corresponding to the primary mobile software and the mobile software subject to detection respectively.

Further, each txt document has N rows corresponding to the N functions in the corresponding mobile software respectively; each row has three columns, wherein the first column corresponds to the hash value, the second column corresponds to an entropy value of the description entropy, and the third column corresponds to the compressed string.

Further, the description entropy is calculated as follows: complexity metrics are given based on different subsequence counts, and then different subsequences in a number of N is represented by histogram vector Histogram(S)=$\{P_1, \ldots, P_N\}$, wherein $P_1 + \ldots P_N = 1$, and $P_N$ represents the complexity metrics of the nth subsequence represented as $P_N$ by normalization; therefore, the description entropy is calculated according to said histogram vector, and the description entropy is proposed as the description entropy of a sequence; a calculation formula of the description entropy is as follows:

$$Hd(\text{Histogram}(S)) = -\Sigma_{i=1}^{N} P_i \log(P_i)$$

wherein Hd( ) represents a function for calculating the description entropy, and a variable within the brackets is the variable required for calculating the function for calculating the description entropy.

Further, said step S2 comprises the following steps:

S21: organizing each of the txt document for the primary mobile software and the txt document for the mobile software subject to detection into a dictionary; the hash values in each dictionary are deemed as key, and strings formed by the corresponding entropy values of the description entropy and the compressed strings are deemed as value;

S22: in the step of calculating the quantity of identical functions, identical functions are filtered out by the hash values, wherein the hash values of the mobile software subject to detection and the hash values of the primary mobile software are each organized as a collection, and then finding out coincidences of the two collections; the coincidences indicate identical hash values, and lengths of the coincidences indicate the quantity of identical functions;

S23: in the step of calculating the quantity of similar functions, removing the identical functions between the dictionary of the mobile software subject to detection and the dictionary of the primary mobile software from the dictionary of the mobile software subject to detection and the dictionary of the primary mobile software, and then organize the rest of the contents of the two dictionaries of the mobile software subject to detection and the primary mobile software into two second dictionaries respectively; and then finding out similar functions between the mobile software subject to detection and the primary mobile software according to entropy values of the description entropy and the compressed strings based on said Hdsim method or said entropy_descpt_sim method;

S24: in the step of calculating the degree of similarity, summing up the quantity of identical functions and the quantity of similar functions as a numerator of a similarity calculation formula; summing up the quantity of identical functions, the quantity of similar functions and a quantity of unique functions of the primary mobile software and the mobile software subject to detection as a denominator of the similarity calculation formula, and using the similarity calculation formula to calculate the degree of similarity; wherein the quantity of unique functions of the primary mobile software and the mobile software subject to detection is a sum of a quantity of functions present in the mobile software subject to detection but absent in the primary mobile software and a quantity of functions present in the primary mobile software but absent in the mobile software subject to detection; the similarity calculation formula is represented as:

$$sim\_value = \frac{same\_elem + similar\_elem}{same\_elem + similar\_elem + special\_elem\_1 + special\_elem\_2}$$

wherein same_elem represents the quantity of identical functions; similar_elem represents the quantity of similar functions; special_elem_1 represents the quantity of functions unique to the primary mobile software, which is equal to the total number of functions in the primary mobile software—the quantity of identical functions—the quantity of similar functions; special_elem_2 represents the quantity of functions unique to the mobile software subject to detection, which is equal to the total number of functions in the mobile software subject to detection—the quantity of identical functions—the quantity of similar functions;

S25: obtaining a value of similarity based on the calculation in step S24.

Further, said Hdsim method is as follows:
directly comparing a length of a description entropy and a compressed string of a function of the primary mobile software and a length of a description entropy and a compressed string of a function of the mobile software subject to detection; if the lengths are the same, the two functions are considered similar, otherwise, the two functions are considered not similar.

Further, said entropy_descpt_sim method is as follows:
using a description entropy distance calculation formula to calculate a description entropy distance of a function; if the description entropy distances of two functions are both smaller than a predetermined comparison threshold value b, the two functions are considered similar, otherwise, the two functions are considered not similar, wherein the description entropy distance calculation formula is as follows:

$$HdD(Hd1, StrLen1, Hd2, StrLen2)$$
$$= \frac{avg(Hd1, Hd2) * avg(StrLen1, StrLen2),}{\max(Hd1, Hd2) * \max(StrLen1, StrLen2)}$$

wherein HdD( ) indicates an entropy distance calculation function, and a variable within the brackets is the variable required for calculating the entropy distance calculation function; avg( ) represents calculation of an average value of values within the brackets; min( ) represents obtaining the smallest value of values within the brackets; max( ) represents obtaining the greatest value of values within the brackets; Hd1, Hd2 represent description entropy of the two functions under comparison; StrLen1, StrLen2 represent lengths of the compressed strings of the two functions under comparison.

The present invention has the following advantages and beneficial effects:

The present invention provides quick security detection of mobile malware big data, so as to accurately detect Android programmed software repackaged or repackaged by replication based on coding functions, to protect the rights and benefits of program developers, and to maintain the ecology of mobile software. In the prior art, these repackaged or replicated programmed software attempt to provide the same program function but with different codes, therefore detection based on massive string distances will result in very high inaccuracy rate. However, so long as the repackaged programmed software retains the key function of the original programmed software, a high degree of similarity can be detected using the method of the present invention based on comparison of description entropy. The present invention calculates a degree of similarity based on compressed string, description entropy and hash value, so as to detect mobile software repackaged and containing malicious attacking codes more quickly and effectively.

DETAILED DESCRIPTION OF THE INVENTION

In order that the object, the technical solutions and the advantages of the present invention are more clearly shown, the technical solutions of the present invention according to an embodiment will be more clearly and completely described with reference to the drawings of the given embodiment of the present invention. Obviously, the embodiment that will be described below is only one of many possible embodiments of the present invention, but not the only one possible embodiment of the present invention. All other embodiments obtained by a person skilled in this field of art based on the embodiment given in the present invention without any inventive effort should also fall within the scope of protection of the present invention.

Embodiment

A method for fast and intelligent comparison and security detection of mobile malware big data according to the embodiment of the present invention proposes Hdsim algorithm and entropy_descpt_sim algorithm based on compressed strings, description entropy and hash values of functions, to calculate a level of similarity of a mobile software, so as to determine whether the mobile software concerned is a repackaged program or not and whether it contains malicious attacking codes.

A hash valve of a function is the only identifier of the function. If the hash values of two functions are the same, it means the two functions are functionally the same. In other words, the two functions are identical.

Description entropy describes the semantic structure of a string and the floating point numbers of a degree of disorder of subsequences in an entire sequence, and it also defines the abstract state of combinations and distributions in the sequence.

Compressed string is the compression of an expression in a function. One statement corresponds to one character.

To determine whether a mobile software is a repackaged program, compare a value of similarity obtained after calculation with a predetermined threshold value. When the value of similarity is greater than or equal to the predetermined threshold value, the mobile software under detection is suspected to be repackaged or replicated.

Figure 1:
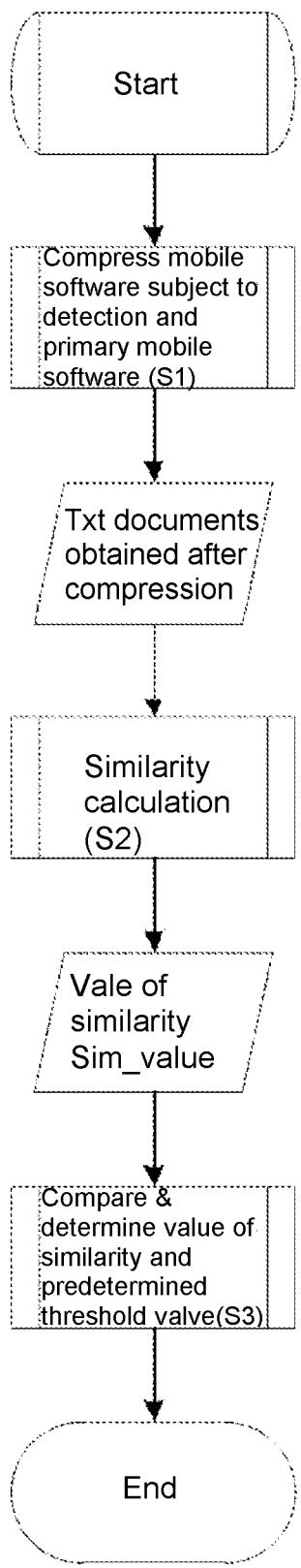
FIG. 1 is a flow chart showing a method for fast and intelligent comparison and security detection of mobile malware big data according to the present invention.
Figure 2:
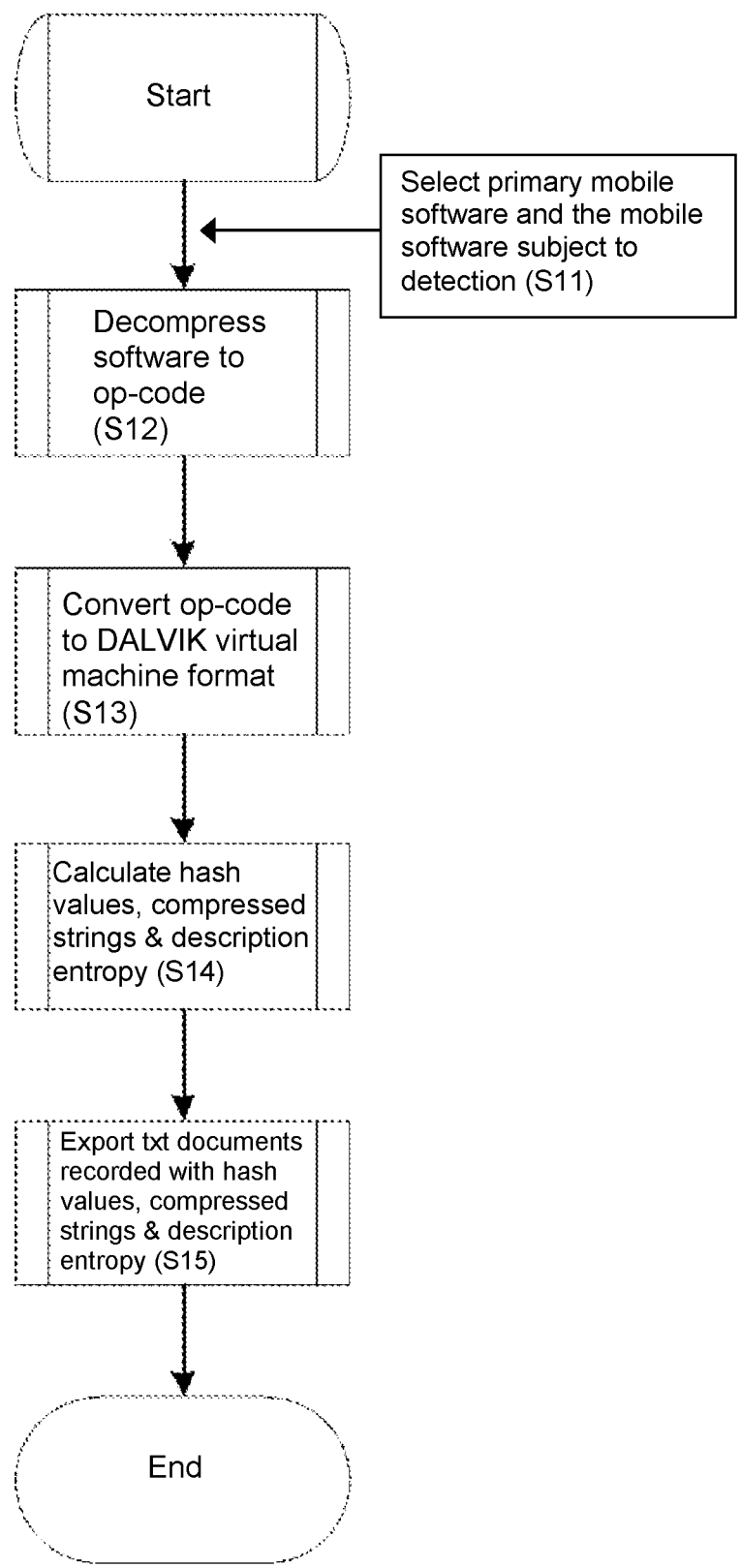
FIG. 2 is a flow chart showing compression of a mobile software subject to detection and a primary mobile software according to an embodiment of the present invention.

The method of the present invention is schematically illustrated in FIG. 1, comprising the following steps:

S1: compressing both a mobile software subject to detection and a primary mobile software into documents of corresponding formats (in the present embodiment, documents in txt format are used, however it should be understood that the present invention should not be limited to storage of documents in this particular format); each of the returned txt documents has N rows (a value of N is positively associated to a quantity of functions in a source code of a corresponding program; if the source code has N functions, the txt document will have N rows); each row has three columns, wherein the first column is a hash value, the second column is an entropy value of description entropy, and the third column is a compressed string. Detailed steps of S1 is illustrated in FIG. 2, comprising the following steps:

S11: selecting a primary mobile software and a mobile software subject to detection arbitrarily from a massive amount of mobile application software as inputs;

S12: decompressing APK documents (mobile software are generally in APK document format) into op-code;

S13: converting the op-code into DALVIK virtual machine format (DVMFLASH);

S14: carrying out basic processing such as calculating a hash value, description entropy and a compressed string for each function in each APK document, wherein the hash value is generated from a sha256 compression function; the compressed string is generated from a Snappy compression function; and the description entropy is obtained by algorithm;

the sha256 compression function is a hash algorithm, mainly used for digital signature algorithm defined in the standard of digital signatures;

the Snappy compression function is a development kit for compression and decompression;

the description entropy is calculated as follows: complexity metrics are given based on different subsequence counts, and then different subsequences in a number of N is represented by histogram vector Histogram(S)={$P_1, \ldots, P_N$}, wherein $P_1 + \ldots P_N = 1$, and $P_N$ represents the complexity metrics of the nth subsequence represented as $P_N$ by normalization; therefore, the description entropy can be calculated as said histogram vector, and the entropy is proposed as the "description entropy" (hereinafter referred to as "Hd") of the sequence; a calculation formula is as follows:

$$Hd(\text{Histogram}(S)) = -\Sigma_{i=1}^{N} P_i \log(P_i)$$

wherein Hd( ) represents a function for calculating the description entropy, and a variable within the brackets is the variable required for calculating the function;

S15: recording the hash values, the description entropy and the compressed strings for each txt document, and then exporting the txt document.

Figure 3:
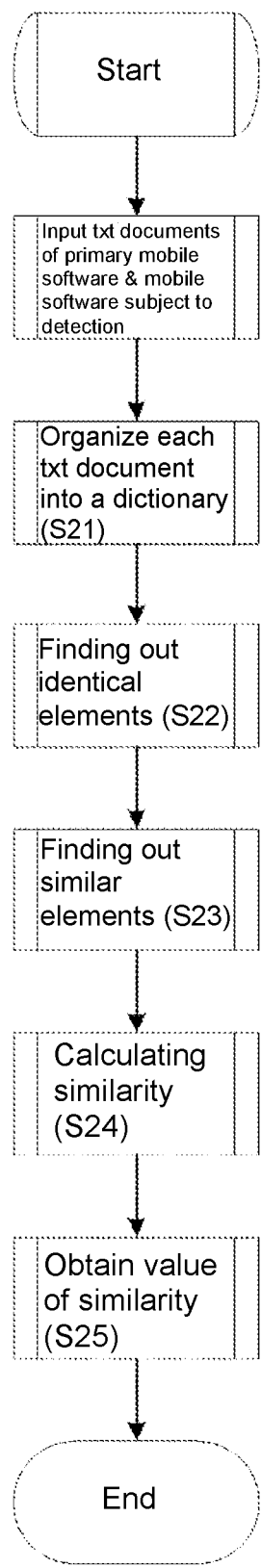
FIG. 3 is a flow chart of finding out a value of similarity according to an embodiment of the present invention.

S2: performing similarity calculation between the primary mobile software and the mobile software subject to detection, as specifically illustrated in FIG. 3, wherein the two txt documents (the first one for the primary mobile software, and the second one of the mobile software under detection) obtained in step S1 are transmitted to Hdsim algorithm for similarity calculation; S2 comprises the following steps:

S21: organizing contents of each txt document into a dictionary to facilitate calculation (the hash values are deemed as "key", and strings formed by the corresponding entropy values of the description entropy and the compressed strings are deemed as "value"), wherein the txt document of the primary mobile software and the txt document of the mobile software subject to detection are each organized into a dictionary;

S22: calculating a quantity of identical functions, wherein identical functions are filtered out by the hash values (the functions represent functions of the source codes of the primary mobile software and the mobile software subject to detection, and one hash value corresponds to one function, therefore when one function in the primary mobile software and a corresponding function in the mobile software subject to detection have the same hash value, the two functions are identical), wherein the hash values (the "key" in the dictionary) of the mobile software subject to detection and the hash values of the primary mobile software are each organized as a collection, and then find out coincidences of the two collections; the coincidences indicate identical hash values, and lengths of the coincidences indicate the quantity of identical functions;

S23: calculating a quantity of similar functions, wherein removing identical functions in the dictionaries between the mobile software subject to detection and the primary mobile software, and then organize the rest of the contents of the mobile software subject to detection and the primary mobile software into two second dictionaries respectively; and then finding out similar functions between the mobile software subject to detection and the primary mobile software according to entropy values of the description entropy and the compressed strings (the "value" in the second dictionaries);

Similar functions can be obtained by either one of the two following methods: the first method is directly comparing lengths of the description entropy and the compressed strings; if the description entropy and the compressed strings of two functions have the same length, the two functions are considered similar; the method of detecting malware by calculation using the above method of finding similar functions is called Hdsim in the present invention.

Another method uses description entropy distances to filter out similar functions; wherein a description entropy distance calculation formula is used to calculate a description entropy distance of a function. If the description entropy distances of two functions are both smaller than a predetermined comparison threshold value b (b=0.01), the two functions are considered similar. The method of detecting malware by calculation using the above method of finding out similar functions is called entropy_descpt_sim in the present invention; the description entropy distance calculation formula is as follows:

$$HdD(Hd1, StrLen1, Hd2, StrLen2)$$
$$= \frac{avg(Hd1, Hd2) * avg(StrLen1, StrLen2),}{\frac{min(Hd1, Hd2) * min(StrLen, StrLen2)}{max(Hd1, Hd2) * max(StrLen1, StrLen2)}}$$

wherein variables and calculations are detailed as follows:
HdD( ) indicates an entropy distance calculation function, and a variable within the brackets is the variable required for calculating the function;
avg( ): calculate an average value of the values within the brackets;
min( ): obtain the smallest value of the values within the brackets;
max( ): obtain the greatest value of the values within the brackets;
Hd1, Hd2: description entropy of the two functions under comparison;
StrLen1, StrLen2: lengths of the compressed strings of the two functions under comparison;

S24: calculating a degree of similarity; wherein the quantity of identical functions and the quantity of similar functions are added together as a numerator of a similarity calculation formula; the quantity of identical functions, the quantity of similar functions and a quantity of unique functions of the two mobile software (i.e. sum of the quantities of functions present in the mobile software subject to detection but absent in the primary mobile software, and functions present in the primary mobile software but absent in the mobile software subject to detection) (The total number of functions in a mobile software is the same as the total number of rows in the corresponding txt document of the mobile software) are added together as a denominator of the similarity calculation formula;

Accordingly, the similarity calculation formula is represented as:

$$sim\_value = \frac{same\_elem + similar\_elem}{same\_elem + similar\_elem + special\_elem\_1 + special\_elem\_2}$$

wherein variables and calculations are detailed as follows:
same_elem: the quantity of identical functions;
similar_elem: the quantity of similar functions;
special_elem_1: the quantity of functions unique to the primary mobile software, which is equal to the total number of functions in the primary mobile software—the quantity of identical functions—the quantity of similar functions;
special_elem_2: the quantity of functions unique to the mobile software subject to detection, which is equal to the total number of functions in the mobile software subject to detection—the quantity of identical functions—the quantity of similar functions;
wherein, the primary mobile software is a mobile application software which was released at an earlier stage, and which is confirmed not suspected to repackaging or replication, among a big data of mobile application software to be detected;
wherein, the mobile software subject to detection is a mobile application software which was released at a later stage or which is yet to be released, and which is suspected to repackaging or replication, among a big data of mobile application software to be detected;

S25: obtaining a value of similarity based on the calculation in step S24.

S3: when the value of similarity is obtained, comparing the value of similarity with a predetermined comparison threshold value a; if the value of similarity is greater than or equal to the predetermined comparison threshold value a, it is determined that the mobile software subject to detection is suspected to repackaging; if the value of similarity is smaller than the predetermined comparison threshold value a, it is determined that the mobile software subject to detection is not suspected to repackaging.

In view of the above, the present invention discloses a method for fast and intelligent comparison and security detection of mobile malware big data. Step S1 of the present invention compresses the APK documents of the application software, which enables similarity comparison between the application software in static conditions (not running the application software), and so the cost of similarity calculation is reduced. In step S2, the present invention uses description entropy to perform similarity calculation, which greatly increases the speed of calculation. In step S3, the threshold value a is obtained through similarity calculations of many repackaged application software and primary application software, and so the threshold value is reliable, and thus the chance of inaccurate determination is very low (an inaccuracy value is determined by instances where application software not being repackaged are determined as repackaged application software, or where repackaged application software are determined as application software not being repackaged).

A preferred embodiment of the present invention is described above. However, the present invention should not be limited to the described embodiment. Any changes, modifications, replacements, combinations, simplifications without deviating from the spirits and principles of the present invention should be considered alternative configurations of equivalent technical effects, and should fall within the scope of protection of the present invention.

What is claimed is:

1. A method for comparison and security detection of mobile malware, comprising:
   S1: compressing both a mobile software subject to detection and a primary mobile software, wherein each of the mobile software subject to detection and the primary mobile software contains functions in a quantity of N, and each of the functions in each of the mobile software subject to detection and the primary mobile software is compressed into a hash value, a description entropy and a compressed string; and then storing each of the compressed mobile software subject to detection and the compressed primary mobile software as a document of a corresponding format;
   S2: calculating a quantity of identical functions between the document of a corresponding format stored for the compressed mobile software subject to detection and the document of a corresponding format stored for the primary mobile software; and then also finding out a quantity of similar functions using Hdsim method or entropy_descpt_sim method; and then calculating a degree of similarity to obtain a value of similarity;
   S3: comparing the value of similarity with a predetermined comparison threshold value a; in response to determining the value of similarity is greater than or equal to the predetermined comparison threshold value a, determining that the mobile software subject to detection is suspected to repackaging; in response to determining the value of similarity is smaller than the predetermined comparison threshold value a, determining that the mobile software subject to detection is not suspected to repackaging;
   said step S1 comprises:
   S11: selecting the primary mobile software and the mobile software subject to detection arbitrarily as inputs from an amount of mobile application software;
   S12: decompressing the primary mobile software and the mobile software subject to detection into op-code;
   S13: converting the op-code into DALVIK virtual machine format;
   S14: using sha256 compression function to generate the hash value for each function in each of the primary mobile software and the mobile software subject to detection; and using a Snappy compression function to generate the compressed string for each function in each of the primary mobile software and the mobile software subject to detection; and also calculating the description entropy for each function in each of the primary mobile software and the mobile software subject to detection;
   S15: recording the hash values, the description entropy and the compressed strings of the functions of the primary mobile software by a txt document, and also recording the hash values, the description entropy and the compressed strings of the functions of the mobile software subject to detection by another txt document, and then exporting the two txt documents corresponding to the primary mobile software and the mobile software subject to detection respectively;
   wherein each of the two txt documents corresponding to the primary mobile software and the mobile software subject to detection has N rows corresponding to the N functions in the corresponding mobile software respectively; each of the N rows has three columns, wherein the first column of the three columns corresponds to the hash value for each function in the corresponding mobile software, the second column of the three columns corresponds to an entropy value of the description entropy for each function in the corresponding mobile software, and the third column of the three columns corresponds to the compressed string for each function in the corresponding mobile software.

2. The method of claim 1, wherein the description entropy for each function in each of the primary mobile software and the mobile software subject to detection is calculated as follows:
   complexity metrics are given based on different subsequence counts, and then different subsequences in a number of N is represented by histogram vector Histogram(S)□ {$P_1, \ldots, P_N$}, wherein $P_1 + \ldots P_N$ □ 1, and $P_N$ represents the complexity metrics of the nth subsequence represented as $P_N$ by normalization; therefore, the description entropy for each function in each of the primary mobile software and the mobile software subject to detection is calculated according to said histogram vector, and the description entropy for each function in each of the primary mobile software and the mobile software subject to detection is proposed as a description entropy of a sequence; a calculation formula of the description entropy for each function in each of the primary mobile software and the mobile software subject to detection is as follows:

$$Hd(\text{Histogram}(S)) = -\Sigma_{i=1}^{N} P_i \log(P_i)$$

wherein Hd( ) represents a function for calculating the description entropy for each function in each of the primary mobile software and the mobile software subject to detection, and a variable within the parentheses is the variable required for calculating the function for calculating the description entropy for each function in each of the primary mobile software and the mobile software subject to detection.

3. The method of claim 1, wherein said step S2 comprises:
   S21: organizing each of the txt document for the primary mobile software and the txt document for the mobile software subject to detection into a dictionary; the hash values in each dictionary are deemed as key, and strings formed by corresponding entropy values of the description entropy in each dictionary and the compressed strings in each dictionary are deemed as value;
   S22: in the step of calculating the quantity of identical functions, identical functions are filtered out by the hash values in each dictionary, wherein the hash values of the mobile software subject to detection and the hash values of the primary mobile software are each organized as a collection, and then finding out coincidences of the two collections; the coincidences indicate identical hash values, and lengths of the coincidences indicate the quantity of identical functions;
   S23: in the step of calculating the quantity of similar functions, removing the identical functions between the dictionary of the mobile software subject to detection and the dictionary of the primary mobile software from the dictionary of the mobile software subject to detection and the dictionary of the primary mobile software, and then organize remaining contents of the two dictionaries of the mobile software subject to detection and the primary mobile software into two second dictionaries respectively; and then finding out similar functions between the mobile software subject to detection and the primary mobile software according to entropy values of the description entropy in each of the two second dictionaries and the compressed strings in each of the two second dictionaries based on said Hdsim method or said entropy_descpt_sim method;

S24: in the step of calculating the degree of similarity, summing up the quantity of identical functions and the quantity of similar functions as a numerator of a similarity calculation formula; summing up the quantity of identical functions, the quantity of similar functions and a quantity of unique functions of the primary mobile software and the mobile software subject to detection as a denominator of the similarity calculation formula, and using the similarity calculation formula to calculate the degree of similarity; wherein the quantity of unique functions of the primary mobile software and the mobile software subject to detection is a sum of a quantity of functions present in the mobile software subject to detection but absent in the primary mobile software and a quantity of functions present in the primary mobile software but absent in the mobile software subject to detection; the similarity calculation formula is represented as:

$$sim\_value = \frac{same\_elem + similar\_elem}{same\_elem + similar\_elem + special\_elem\_1 + special\_elem\_2}$$

wherein same_elem represents the quantity of identical functions; similar_elem represents the quantity of similar functions: special_elem_1 represents the quantity of functions unique to the primary mobile software, which is equal to a total number of functions in the primary mobile software—the quantity of identical functions—the quantity of similar functions; special_elem_2 represents the quantity of functions unique to the mobile software subject to detection, which is equal to a total number of functions in the mobile software subject to detection—the quantity of identical functions—the quantity of similar functions;

S25: obtaining the value of similarity based on the calculation in step S24.

4. The method of claim 3, wherein said Hdsim method is as follows: directly comparing a length of a description entropy and a compressed string of a function of the primary mobile software and a length of a description entropy and a compressed string of a function of the mobile software subject to detection; in response to determining the lengths being compared are the same, the two functions associated with the lengths being compared are considered similar, otherwise, the two functions associated with the lengths being compared are considered not similar.

5. The method of claim 3, wherein said entropy_descpt_sim method is as follows:

using a description entropy distance calculation formula to calculate a description entropy distance of a function; in response to determining description entropy distances of two functions are both smaller than a predetermined comparison threshold value b, the two functions are considered similar, otherwise, the two functions are considered not similar;

wherein the description entropy distance calculation formula is as follows:

$$HdD(Hd1, StrLen1, Hd2, StrLen2)$$
$$= \frac{avg(Hd1, Hd2) * avg(StrLen1, StrLen2),}{max(Hd1, Hd2) * max(StrLen1, StrLen2)}$$
$$\phantom{=}\frac{min(Hd1, Hd2) * min(StrLen, StrLen2)}{max(Hd1, Hd2) * max(StrLen1, StrLen2)}$$

wherein HdD( ) indicates an entropy distance calculation function, and a variable within the parentheses is the variable required for calculating the entropy distance calculation function; avg( ) represents calculation of an average value of values within the parentheses; min( ) represents obtaining a smallest value of values within the parentheses; max( ) represents obtaining a greatest value of values within the parentheses; Hd1, Hd2 represent description entropy of the two functions under comparison; StrLen1, StrLen2 represent lengths of compressed strings of the two functions under comparison.

* * * * *